United States Patent [19]

Salisbury et al.

[11] Patent Number: 4,694,180

[45] Date of Patent: Sep. 15, 1987

[54] CURING OVEN FOR ADHESIVE

[75] Inventors: Richard Salisbury, Norfolk; Stephen W. Wyman, N. Attleboro, both of Mass.

[73] Assignee: Loctite Corporation, Newington, Conn.

[21] Appl. No.: 778,214

[22] Filed: Sep. 20, 1985

[51] Int. Cl.[4] ............................................. G01N 23/00
[52] U.S. Cl. ................................ 250/455.1; 250/452.1
[58] Field of Search ............. 250/455.1, 492.1, 504 R; 156/379.6, 381; 219/343, 354, 405, 411

[56] References Cited

U.S. PATENT DOCUMENTS

| 2,245,762 | 6/1941 | Stefani et al. | 250/455.1 |
| 3,433,949 | 3/1969 | Truhan | 250/455.1 |
| 3,967,385 | 7/1976 | Culbertson | 219/343 |
| 4,048,916 | 9/1977 | Silverman et al. | 219/405 |
| 4,591,724 | 5/1986 | Fuse et al. | 250/492.1 |

Primary Examiner—Bruce C. Anderson

[57] ABSTRACT

A curing oven for adhesive which is curable by ultraviolet radiation. The curing oven includes a housing having a curing chamber for containing an item to be cured, an access opening to the chamber, a closure member for the access opening, an ultraviolet lamp which is located above the curing chamber, a primary enclosure for the lamp which includes a top opening above the lamp and a bottom opening which is below the lamp. The bottom opening forms an opening to the curing chamber to enable ultraviolet radiation to pass from the lamp to the curing chamber and to enable a convective airflow to develop from the bottom opening to the top opening across the lamp. Means are provided for creating an airflow above the top opening for removing heated air which passes through the top opening from the convective airflow.

22 Claims, 7 Drawing Figures

CURING OVEN FOR ADHESIVE

BACKGROUND OF THE INVENTION

The present invention relates generally to a curing oven for adhesive which is cured at an accelerated rate when subjected to ultraviolet radiation. Adhesive is used extensively in many industries as the most efficient means of joining two or more elements, particular for printed circuit boards in the electronics industry. Adhesive is also used in the medical industry, for example, for fabrication of syringes. The inherent disadvantage of the use of adhesive is the time factor for setting or curing the adhesive. This time problem has been solved to a great extent by the use of ultraviolet radiation curing. Ultraviolet radiation curing is a process which involves polymerization, or cross linking of monomers upon exposure of the monomer to ultraviolet radiation. Some monomers do not polymerize when exposed to ultraviolet radiation. For these monomers, a sensitizer is added which absorbs ultraviolet energy, thereby initiating polymerization reaction in the monomer. In addition to a substantial saving of time, there is also a considerable saving in plant space, since an ultraviolet curing line is considerable shorter than previous systems, which for example, utilize gas ovens. Another advantage of ultraviolet curing is that there are no solvents to be discharged into the atmosphere. Since the adhesive polymerizes completely, there is a substantial reduction in air pollution.

One of the most efficient ultraviolet radiation curing systems includes a tubular quartz lamp which includes mercury and argon and produces a high temperature electric arc. A heat sink reflector is positioned above the lamp which reflects the ultraviolet radiation to an area below the lamp where the items to be cured are placed. Cooling systems are provided which work with the heat sink to maintain the lamp at a predetermined temperature for maximum efficiency and to prevent overheating of the lamp to prevent damaging the lamp. One of the major problems of providing a heat sink as part of the cooling system for maintaining the ultraviolet lamp temperature within a predetermined critical range is that the system does not react fast enough to changes in bulb temperature. Heat from the bulb must be absorbed by the heat sink which then must be cooled by the cooling system. This produces wide swings in bulb temperature and a delayed reaction time from adjusting the temperature of the bulb to a predetermined set temperature. In addition to operational problems, the heat sink represents considerable added weight to the curing oven and represents a substantial part of the cost of the oven. The bulb temperature is too critical for direct cooling of the bulb so that the employment of a heat sink system remains the only viable system of the prior art curing ovens.

There are also many safety problems involved with the use of ultraviolet radiation curing systems. The high intensity of the ultraviolet radiation can cause serious burns to the skin and eyes. This problem is complicated by the fact that ultraviolet burns are not felt for several hours, so that serious damage can occur before the individual realizes that damage is occurring. A considerable amount of infrared energy is also produced by the ultraviolet curing system. This also represents a danger to personnel and can damage the products which are being treated by the ultraviolet radiation. Although shields are provided to protect individuals from ultraviolet radiation, a certain amount of radiation still escapes the system. These and other difficulties experienced with the prior art devices have been obviated by the present invention.

It is, therefore, a principle object of the invention to provide an ultraviolet curing system which includes air cooling means which is effective to maintain the ultraviolet bulb temperature within a predetermined temperature range without the use of a heat sink.

Another object of this invention is the provision of a airflow cooling system for an ultraviolet curing oven which creates an induced airflow across the bulb for maintaining the bulb within a predetermined temperature range.

A further object of the present invention is the provision of an ultraviolet curing oven which is readily accessible for insertion of items to be cured and which has automatic safety controls for preventing an individual from being exposed to ultraviolet radiation.

It is a further object of the invention to provide an ultraviolet radiation curing oven which is efficient, easy to operate and is substantially safer to operate than existing systems.

With these and other objects in view, as will be apparent to those skilled in the art, the invention resides in the combination of parts set forth in the specification and covered by the claims hereto.

SUMMARY OF THE INVENTION

The invention consists of a curing oven for adhesive which is curable by ultraviolet radiation. The oven comprises a curing chamber for containing an item to be cured, an access opening to the chamber, an openable closure member for the access opening, an ultraviolet lamp which is located above the curing chamber, and an enclosure for the lamp. The enclosure has a top opening above the lamp a bottom opening below the lamp which also forms an opening to the curing chamber to enable ultraviolet radiation to pass from the lamp to the curing chamber and to enable a convective airflow to develop from the bottom opening to the top opening across the lamp. Means are provided for creating an airflow above the top opening for removing heated air which passes through the top opening from the convective airflow for maintaining the temperature of the lamp within the predetermined temperature range.

BRIEF DESCRIPTION OF THE DRAWINGS

The character of the invention, however, may be best understood by reference to one of its structural forms, as illustrated by the accompanying drawings, in which.

DESCRIPTION OF THE PREFERRED EMBODIMENT

Figure 1:
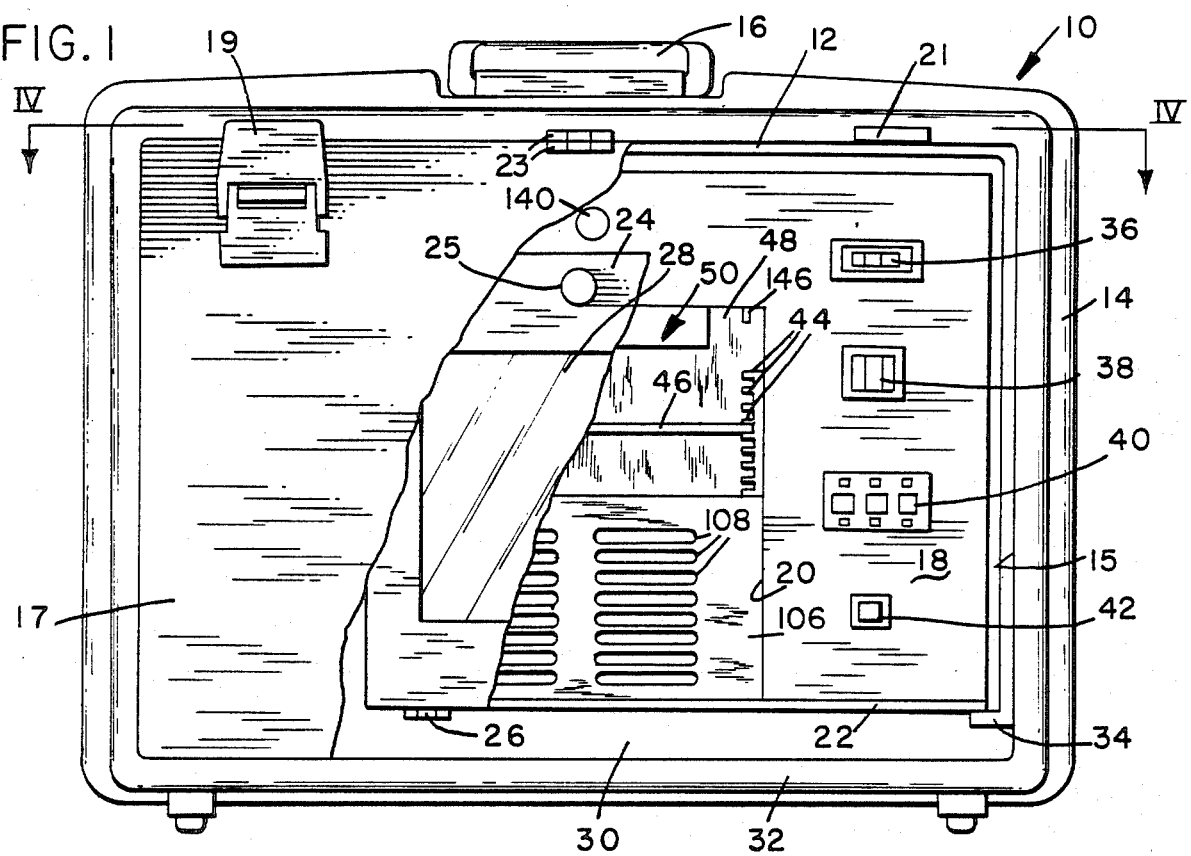
FIG. 1 is a front elevational view of a curing oven embodying the principles of the present invention.
Figure 2:
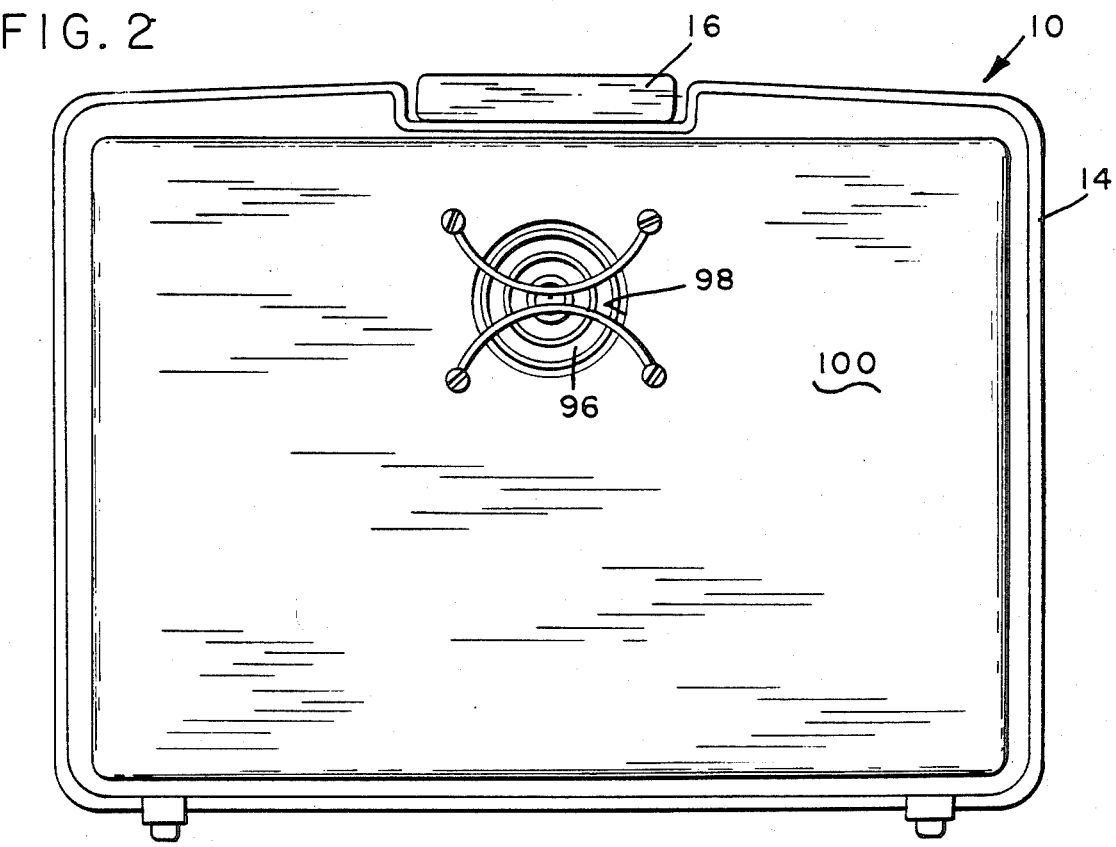
FIG. 2 is a rear elevational view of the curing oven.
Figure 3:
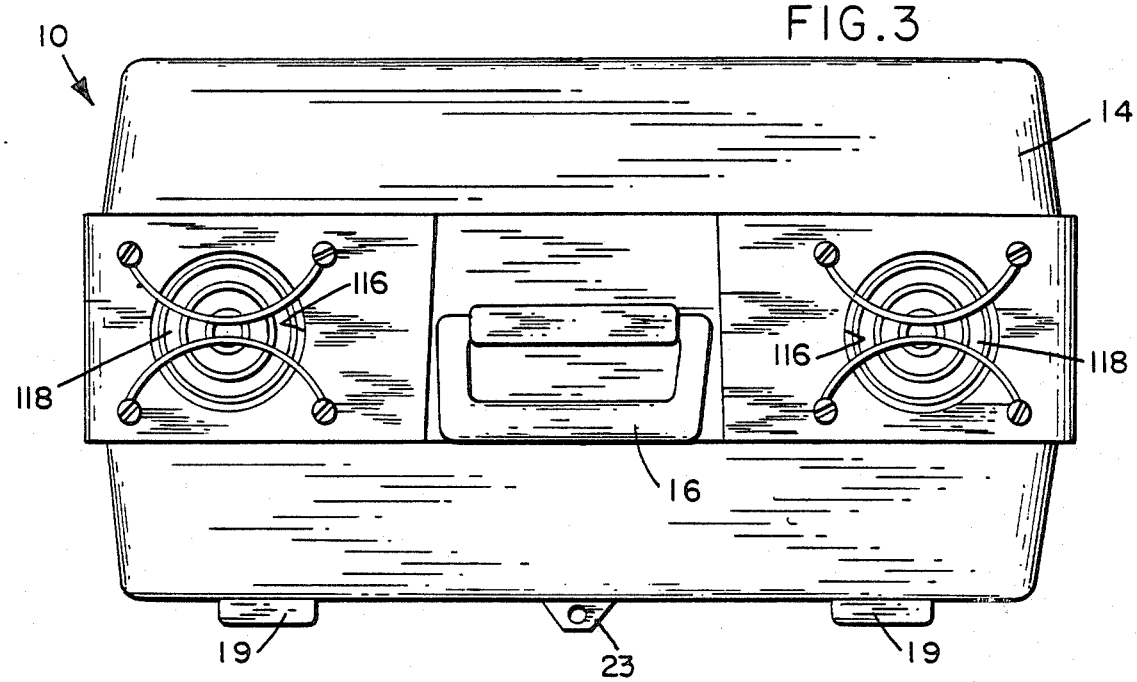
FIG. 3 is a top plan view of the curing oven.

Referring first to FIGS. 1–3, the curing oven of the present invention is generally indicated by the reference numeral 10 and comprises a housing 12 which is enclosed within an outer carrying case 14. The outer carrying case 14 includes a carrying handle 16 at the top of the case, a front opening 15 and a front cover 17 which is loosely pivoted at the bottom of the case. The top of the cover 17 is provided with a pair of latches 19 which are adapted to engage a pair of catches 21 along the upper front edge of the carrying case. A pair of corresponding apertured flanges 23 are located at the upper front edge of the carrying case and the top edge of the cover 17 for receiving a lock or retaining pin. The bottom of the cover 17 is pivoted by means of flanges which engage corresponding flanges at the bottom of the case which enable the cover to pivot from the vertical position shown in FIG. 1 to a horizontal position near the bottom of the case. When in the horizontal position, the cover 17 is free to slide along the bottom wall 32 of the case. This enables the cover to be temporarily stored within a space 30 which is formed between the bottom wall 32 of the the case 12 and a perforated bottom wall 22 which supports the housing 12 within the carrying case 14. The housing 12 is slidably mounted on flanges 34 of the carrying case to enable the housing to be inserted into the case and removed from the case through the front opening 15.

The housing 12 comprises a vertical front wall 18 which includes an access opening 20 and a door 24 which is hinged at 26 to the bottom wall 22 for closing the access opening 20. The door 24 includes an inspection window 28 which is made of a material which is transparent to visual radiation and opaque to ultraviolet radiation. The front of the door 24 is provided with an opening knob 25 and the rear of the door is provided with a ferrous element, not shown, for engaging a corresponding magnet, also not shown, on the front wall 18. The front wall 18 also contains a main power switch 36, a lamp switch 38, a cycle timer 40, and a start switch 42. All of these electrical components are described in greater detail in a subsequent section which deals with the electrical controls for the curing oven. A plurality of flanges 44 are located on opposite sides of the access opening 20 for supporting a perforated tray 46. The tray 46 is adapted to be slidingly supported on horizontally opposing flanges 44 so that the tray 46 can be adjustably position vertically within the access opening 20. The items to be cured are placed on the tray 46 so that the tray 46 defines the lower limit of a curing chamber 48.

Figure 4:
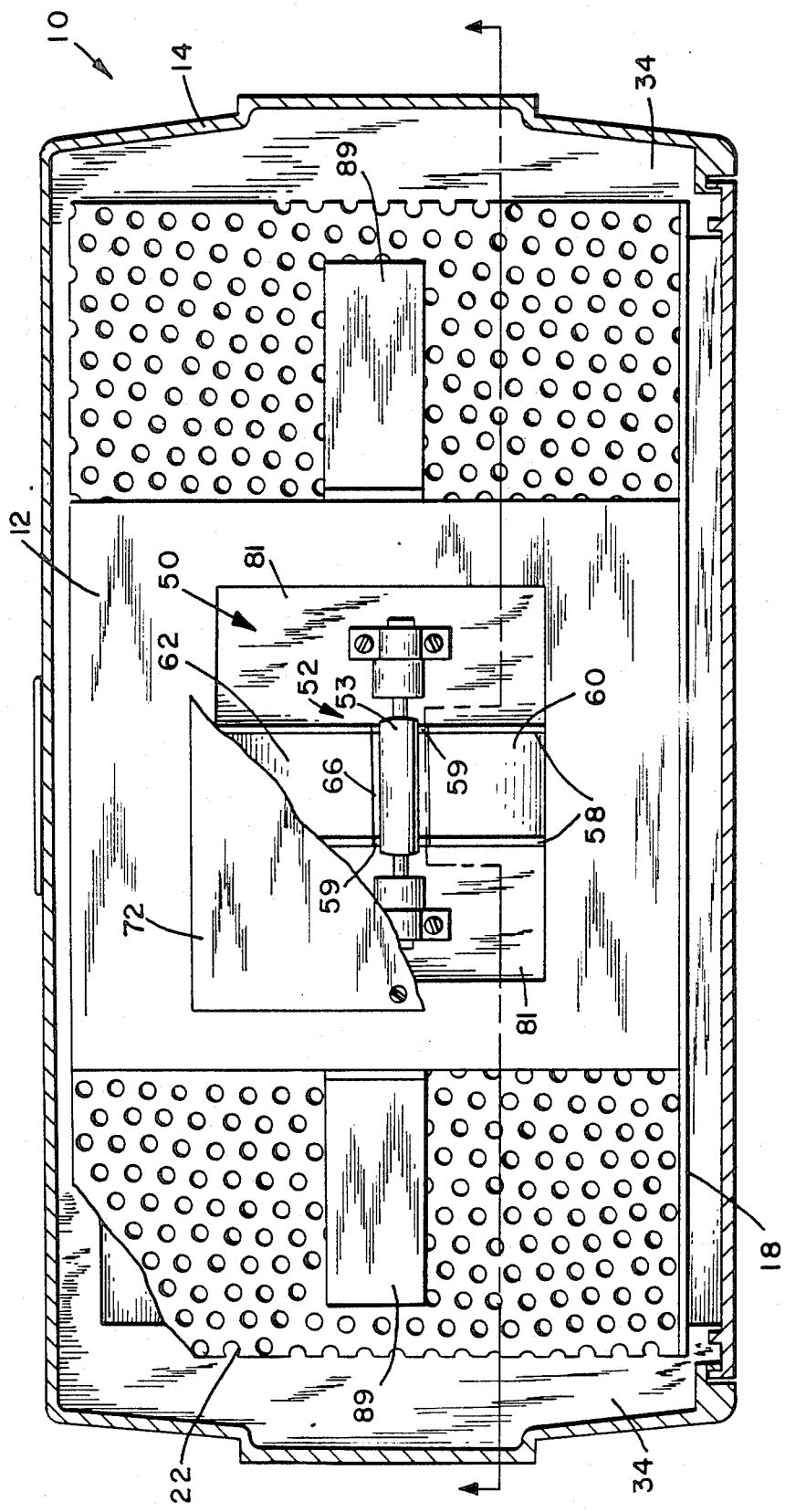
FIG. 4 is a horizontal cross-sectional view taken along the line IV—IV of FIG. 1.
Figure 5:
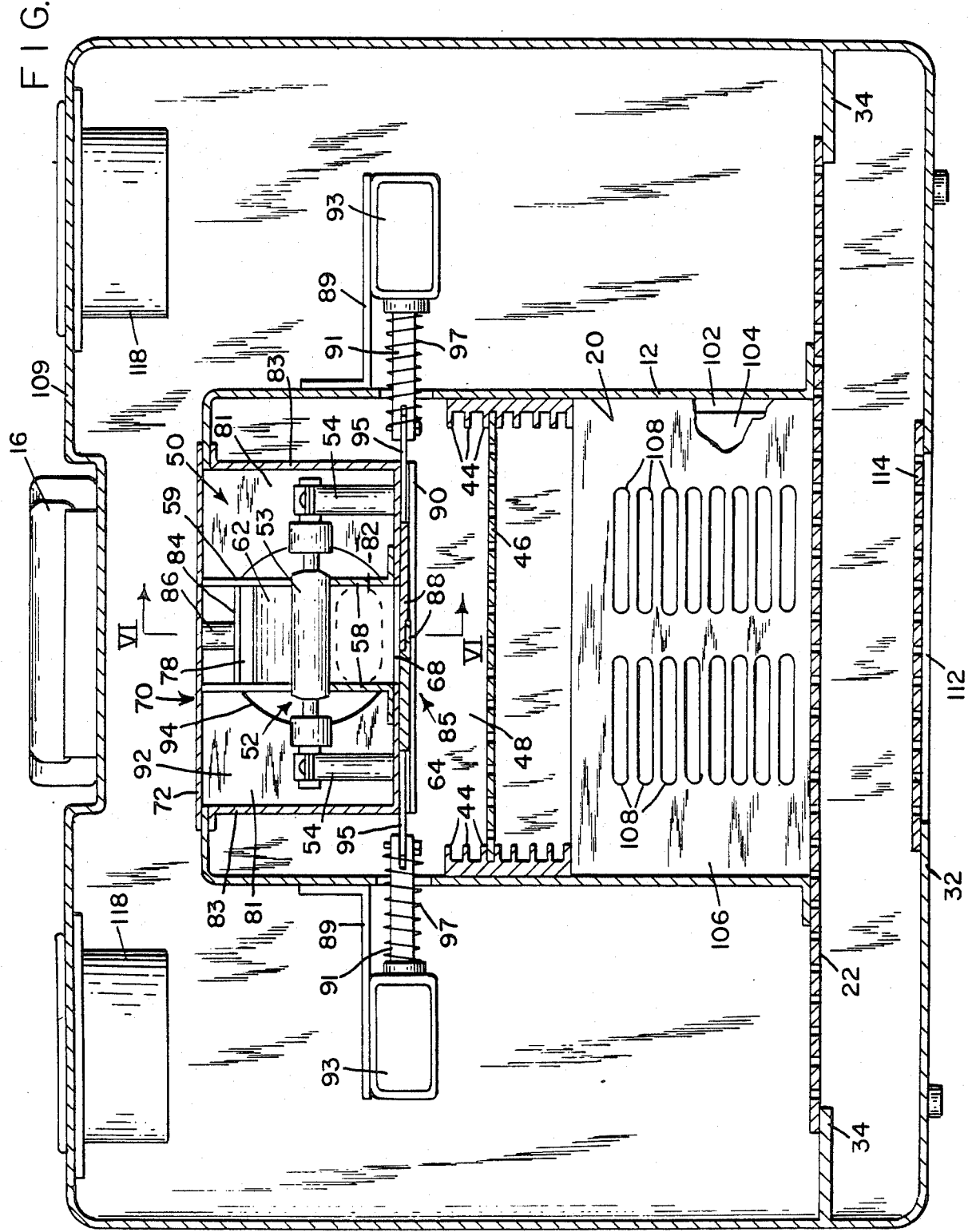
FIG. 5 is vertical cross-sectional view taken along the line V—V of FIG. 4.
Figure 6:
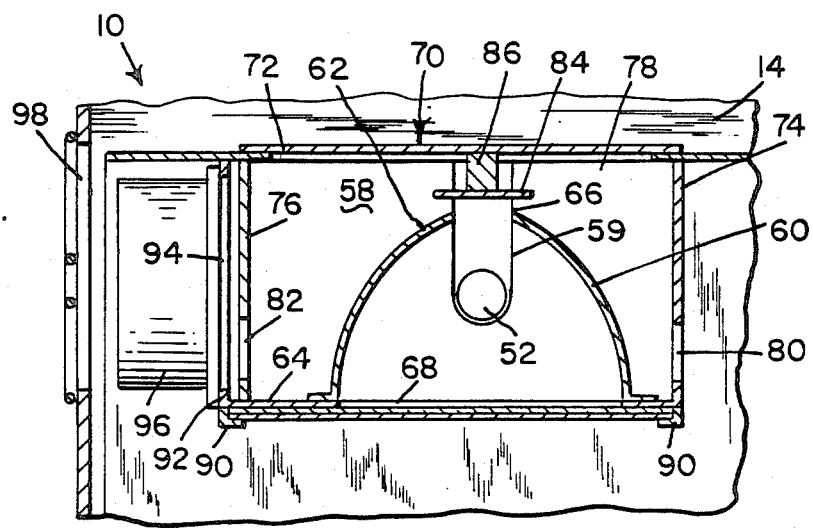
FIG. 6 is a vertical cross-sectional view taken along the line VI—VI of FIG. 5.

Referring also to FIGS. 4–6 an ultraviolet lamp assembly, generally indicated by the reference numeral 50, is located above the curing chamber 48. The ultraviolet lamp assembly 50 comprises an ultraviolet lamp which is generally indicated by the reference numeral 52 and which includes a bulb 53. Each end of the lamp 52 is supported on apair of posts 54 which extend upwardly from a bottom wall 64. The bottom wall 64 forms the upper limit of the curing chamber 48. The bulb portion 53 of the lamp 52 is located within a primary enclosure which is generally indicated by the reference numeral 56. The primary enclosure 56 is formed by a pair of side walls 58 a curved front wall 60 and a curved rear wall 62. The ends of the bulb portion 53 of the lamp 52 are located within a pair of slots 59 which extend downwardly from the top edges of the side walls 58. This enables the lamp 52 to be inserted within the primary enclosure 56 from the top edges of the side walls 58. The primary enclosure 56 also includes a bottom opening 68 in the bottom wall 64. The front walls 60 extends from a point below and in front of the bulb 52 to the slot 59 to a point above the bulb 52. The rear wall 62 extends from a point to the rear of and below the bulb 52 to the slot 59 at a point above the bulb 52. The space between the inner ends of the walls 60 and 62 defines a top opening 66 of the primary enclosure 56. The curvature of each of the walls 60 and 62 defines a convex outer surface.

The ultraviolet lamp assembly 50 also comprises an outer enclosure which is generally indicated by the reference numeral 70. The outer enclosure 70 comprises a top wall 72, a front wall 74, a back wall 76, a bottom wall 64, and the side walls 58. The space which is formed between the primary enclosure 56 and the outer enclosure 70 defines an airflow channel 78. The front wall 74 is provided with an inlet opening 80 which is located below the top opening 66 near the forward base of the curved front wall 60. The back wall 76 is provided with an outlet opening 82 which is located below the top opening 66 near the rearward base of the curved rear wall 62. The shape of the flow channel 78 which is defined between the top wall 72 and the curved walls 60 and 62 produces a venturi effect at the top opening 66 when air is caused to flow through the channel 78 from the inlet opening 80 to the outlet opening 82. The airflow across the top opening 66 causes a pressure drop at the opening 66 for a purpose to be described.

A reflector 84 is fixed to a post 86 which is, in turn, fixed to the under surface of the top wall 72 so that the reflector extends freely within the flow channel 78 above the top opening 66.

The opening 68 is closed by a two-part sliding door which is generally indicated by the reference numeral 85 and which is formed by a pair of plates 88. Each plate 88 is slidably mounted on a pair of flanges 90 which extend downwardly at the front and rear edges of the bottom wall 64. Each plate 88 is connected to a plunger 91 of a solenoid 93 by means of a connecting rod 95. Each plunger 91 is maintained in its extended position as shown in FIG. 5 by a spring 97. The spring 97 also urges the two plates 88 toward each other to maintain the door 85 in a normally closed position. The inner ends of the plates 88 are shaped so that they overlap when the door 85 is in a closed position as shown in FIG. 5. An outer back wall 92 is located at the rear of the back wall 76 and has a large opening 94 which is in register with the opening 82 in the rear wall 76. A fan 96 is attached to the outer back wall 92 so that it is in register with the large opening 94. The fan 96 is also in register with the opening 98 in the rear wall 100 of the carrying case 14. When the fan 96 is energized, air is drawn through the openings 82 and 94 from the inlet opening 80 and exhausted through the opening 98 in the casing 14. This creates an airflow in the flow channels 78 from the inlet opening 80 to the outlet opening 82 across the top opening 66 of the primary enclosure 56. The large opening 94 extends beyond the side walls 82 as shown in FIG. 5. These extended portions of the openign 94 are in register with chambers 81 which are formed between the side walls 58 and outer side walls 83. The ends of the lamp 52 are located within the chambers 81. The front wall 74 has an opening to each chamber 81 so that when the fan 96 is energized an airflow is created within the channels 81 for cooling the ends of the lamp 52.

Referring particularly to FIGS. 1 and 5, the housing 12 includes a compartment 102 which is located below the curing chamber 48. The compartment 102 contains a transformer 104 for increasing the voltage to the ultraviolet lamp 52. The front wall of the compartment 102, which is indicated by the reference numeral 106, contains a plurality of ventilation openings 108. The bottom of the compartment 102 is formed by the perforated wall 22. The bottom wall 32 of the carrying case 14 has an opening 112 which is covered by a perforated plate 114. The carrying case 14 also has a top wall 109 which contains a pair of openings 116. An electric fan 118 is mounted to the undersurface of the top wall 109 beneath each of the openings 116. The fans 118 is effective to vent air to the outside of the carrying case 14. When the fans 118 are energized, air is drawn into the carrying case 14 through the bottom opening 112 and the perforated plate 114 and then through the perforated bottom wall 22. Some of the air is drawn straight up to the fans 118, across the solenoids 93 and other electrical components which are closely associated with the solenoids. Some of the air is also drawn into the compartment 102 and through the openings 108 to effectively cool the transformer 104.

Figure 7:
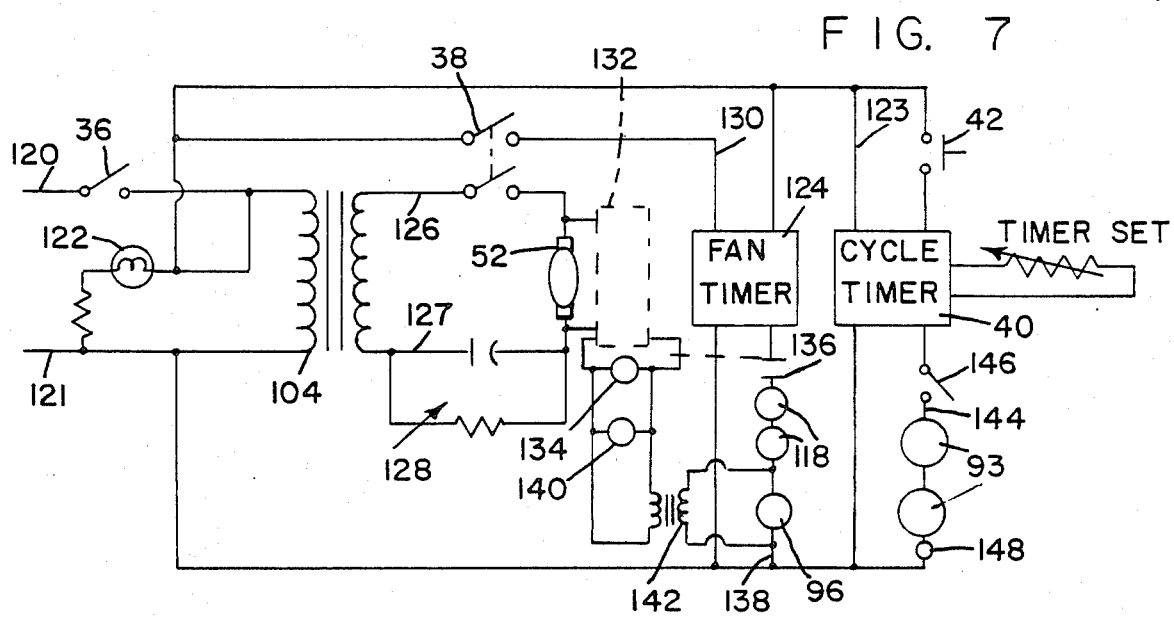
FIG. 7 is a schematic wiring diagram of the electrical control means for the curing oven.

The operation and advantages of the present invention will now be readily understood in view of the above description. Referring particular to FIG. 7 which shows the electrical controls for the curing oven of the present invention, the electrical controls include a pair of power lines 120 and 121 which are connected to a source of electrical power. The power lines 120 and 121 are connected to the primary winding of the transformer 104. The main power switch 36, is located on the power line 120 so that upon closing of the switch 36 the transformer 104 is energized. The closing of the main power switch 36 also energizes the cycle timer 40 which is located on line 123 which is connected across the power lines 120 and 121. The closing of the main power switch 36 also energizes an indicator light 122 which is located within a clear plastic button for closing the switch 36. The button for switch 36 is located on the front wall 18 of the housing 12 as indicated in FIG. 1 so that the indicatorlight is clearly visible to the operator. The secondary winding of the transformer 104 is connected to the lamp 52 by means of a pair of lines 126 and 127. Line 126 is connected to the lamp 52 through the lamp switch 38 which is a double pole double throw switch. The line 127 is connected to the lamp 52 through a capacitated circuit 128. When the lamp switch 38 is closed the lamp 52 is energized. The closing of the lamp switch 38 also energizes a fan timer 124 which is located on a line 130. The lamp 52 represents a resistance loads so that when the lamp is energized the lamp becomes increasingly hotter. As the temperature of the lamp 52 increases the voltage across the lamp also increases. For example, 650 centigrade the lamp will generate ultraviolet radiation having sufficient intensity to effectively cure adhesive which is subjected to the radiation. When this threshold temperature is reached, the voltage across the lamp 52 is also at a predetermined value, for example 90 volts. A solid state switching circuit, indicated by the reference numeral 32 is connected across the lamp 52. The circuit 132 includes a triac opti-coupler circuit which is responsive to a change in voltage across the lamp 52 so that when the voltage across the lamp reaches a predetermined value the circuit 132 is effective to energize a solid state relay 134 and a warning light 140. Energization of the solid state relay 134 causes its normally opened contact 136 to close. The contact 136 is located on the line 138 which also contains the fans 96 and 118. The line 138 is connected to the power line 121 and is operatively connected to the power line 120 through the fan timer 124. The warning light 140 serves as a visual indication to the operator that the lamp 52 is energized and is fully operational.

When the contact 136 of the relay 134 closes, the fans 96 and 118 are energized, the primary winding of a transformer 142 is connected across the fan 96. The secondary winding of the transformer 142 has a small voltage which is substantial the same as the voltage from the solid state circuit 132 for maintaining the relay 134 energized, which in effect locks in the relay 134 to maintain the contact 136 closed.

Energization of the fan 96 creates an air flow through the flow channel 78 through the inlet opening 80 through the outlet opening 82. The lamp 52 heats up the air within the primary enclosure 56 which creates a conductive air flow from the bottom opening 68 through the top opening 66. The air flow across the top opening 66 which is induced by the fan 96 causes a pressure drop at the top opening 66 to intensify the upward air flow across the lamp 52 from the bottom opening 68. This effectively cools the bulb 52 and prevents the temperature of the bulb from exceeding an upper predetermined temperature. The bulb temperature is thereby maintained within an optimum operating temperature range, for example, between 650° centigrade and 700° centigrade.

When the operator sees that the ready light or warning light 140 is on, he/she knows that the ultraviolet lamp 52 is up to the predetermined operating temperature. The operator then sets the cycle timer 40 to the desired exposure time for the item to be cured. The operator then opens the door 24 and places the item to be cured onto the perforated tray 46 within the curing chamber 48. The door 24 is then closed and the operator depresses a button on the front wall 18 of the housing which effectively closes the switch 42. When the door 42 is closed hitting gauges a spring bias contact arm of a normally opened limit switch 146 to close the switch. The limit switch 146, the cycle timer 40 and the solenoid 93 are all located on line 144. When the door 24 is closed so that the limit switch 146 is closed and the button for the switch 42 is depressed to close the switch 42, the solenoids 93 are energized and the cycle timer 40 is actuated to begin a curing cycle. The cycle timer 40 is adjustable for any desired time setting by means of setting buttons which are located on a control panel portion of the timer which is located on the front wall 18 of the housing, as shown in FIG. 1. The actuating button for the start switch 42 is transparent and contains an indicator light 148 which is energized when the solenoids 3 are energized. When the button for the start switch 42 is released, the cycle timer 40 maintains the solenoids 93 and the lamp 148 energized for the entire curing cycle. When the solenoids 93 are energized, the plungers 91 will be drawn into their respected solenoids and the plates 88 will be drawn apart, thereby opening sliding door 85. This allows ultraviolet radiation to pass from the lamp 52 and the reflector 84 into the curing chamber 48 for curing the item which has been placed into the chamber 48. However, if the door 24 is accidentally opened during the curing cycle, the limit switch 146 will open, thereby de-energizing the solenoids 93. This causes the door 85 to return to its normally closed position At the end of the timing cycle, the cycle timer 40 is effective to de-energize the solenoids 93 and the indicator light 148. This causes the door 85 to close and the operator can then remove the cured item from the curing chamber 48. When the lamp switch 38 is opened to de-energize the lamp 52, the relay 134 remains energized by means of the transformer 142 so that the contact 136 remains closed. This means that the fans 96 and 118 remain energized so that they can continue to cool the lamp 52 and other electrical components. The opening of the lamp switch 38 represents a signal to the fan timer to initiate a timing cycle. After a predetermined time period, the fan timer de-energizes the line 138 thereby de-energizing the fans 96 and 118. When the line 138 is de-energized, the transformer 142 is de-energized thereby de-energizing the relay 134 and the warning light 140. This causes the normally opened contact 136 to return to its normally open state.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. Curing oven for adhesive which is curable by ultraviolet radiation, said oven comprising:
   (a) a housing having a curing chamber for containing an item which has an adhesive which is curable by ultraviolet radiation, said housing having an access opening to said chamber which enables said item to be inserted into and removed from said chamber,
   (b) an openable closure member for said access opening,
   (c) an ultraviolet lamp which is located above said curing chamber, said lamp being effective when energized to become heated and for generating ultraviolet radiation within a predetermined temperature range of said lamp,
   (d) a primary enclosure for said lamp, said primary enclosure having a top opening which is directly above said lamp and a bottom opening which is directly below said lamp for the entire length of said lamp, said bottom opening forming an opening to said curing chamber to enable ultraviolet radiation to pass from said lamp to said curing chamber, said primary enclosure completely enclosing said lamp except for said top and bottom openings, said lamp causing air within said primary enclosure to become heated and said top and bottom openings enabling an upward convective air flow to develop from said bottom opening to said top opening across said lamp for cooling said lamp,
   (e) an outer enclosure which is located outside of said primary enclosure so as to form a flow channel between said outer enclosure and said primary enclosure, said top opening forming an air flow communication between the space within said primary enclosure and said flow channel,
   (f) an inlet opening at one end of said flow channel,
   (g) an outlet opening at the opposite end of said channel, and
   (h) a fan for creating a horizontal air flow through said flow channel from said inlet opening to said outlet opening and above said top opening for removing heated air which passes through said top opening from said convective air flow for maintaining the temperature of said lamp within said predetermined temperature range.

2. Curing oven as recited in claim 1, wherein said inlet and outlet openings are located below said top opening and said primary enclosure comprises:
   (a) a first wall which is located between said inlet opening and said lamp, said first wall having a convex curved outer surface which faces said inlet opening, and
   (b) a second wall which is located between said outlet opening and said lamp, said second wall having a convex curved outer surface which faces said outlet opening.

3. Curing oven as recited in claim 1, wherein said fan is operatively connected to said outlet opening for drawing air through said flow channel.

4. Curing oven as recited in claim 3, wherein said inlet opening is operatively connected to said curing chamber and said curing chamber has at least one air intake opening to the outside of said housing.

5. Curing oven as recited in claim 2, wherein said curing chamber contains a perforated horizontal tray for supporting the items to the cured, said perforated tray being located between said inlet opening and said air intake opening so that air flows through the perforations in said tray from said intake opening for cooling said item.

6. Curing oven as recited in claim 1, wherein a reflector is located directly above said top opening within said flow channel opening for reflecting ultraviolet radiation from said lamp through said bottom opening to said curing chamber.

7. Curing oven as recited in claim 6, wherein said outer enclosure includes a top wall, and said reflector is attached to and extends downwardly from said top wall.

8. Curing oven as recited in claim 1, wherein said closure member has a viewing window which is made of a material which is transparent to visible radiation and opaque to ultraviolet radiation.

9. Curing oven for adhesive which is curable by ultraviolet radiation, said oven comprising:
   (a) a housing having a curing chamber for containing an item which has an adhesive which is curable by ultraviolet radiation, said housing having an access opening to said chamber which enables said item to be inserted into and removed from said chamber,
   (b) an openable closure member for said access opening,
   (c) an ultraviolet lamp which is located above said curing chamber, said lamp being effective when energized to become heated and for generating ultraviolet radiation within a predetermined temperature range of said lamp,
   (d) a primary enclosure for said lamp, said primary enclosure having a top opening which is directly above said lamp and a bottom opening which is directly below said lamp, said bottom opening forming an opening to said curing chamber to enable ultraviolet radiation to pass from said lamp to said curing chamber, said lamp causing air within said primary enclosure to become heated and said top and bottom openings enabling an upward convective airflow to develop from said bottom opening to said top opening across said lamp for cooling said lamp, (e) an outer enclosure which is located outside of said primary enclosure so as to form a flow channel between said outer enclosure and said primary enclosure, said top opening forming an airflow communication between the space within said primary enclosure and said flow channel, (f) an inlet opening at one end of said flow channel, (g) an outlet opening at the opposite end of said channel, (h) a fan for creating a horizontal airflow through said flow channel from said inlet opening to said outlet opening and above said top opening for removing heated air which passes through said top opening from said convective airflow for maintaining the temperature of said lamp within said predetermined temperature range, and (i) a reflector which is located directly above said top opening for reflecting ultraviolet radiation from said lamp through said bottom opening to said curing chamber.

10. A portable curing oven for adhesive which is curable by ultraviolet radiation, said oven comprising:

(a) a carrying case which includes a carrying handle, a front opening and an openable outer closure member for closing said front opening, (b) a housing which is located within said carrying case, having a curing chamber for containing an item which has an adhesive which is curable by ultraviolet radiation, said housing having a front wall which is directly behind said closure member, an access opening in said front wall to said chamber which enables said item to be inserted into and removed from said chamber, (c) an openable closure member for said access opening, (d) an ultraviolet lamp which is located above said curing chamber, said lamp being effective when energized to become heated and for generating ultraviolet radiation within a predetermined temperature range of said lamp, (e) a primary enclosure for said lamp, said primary enclosure having a top opening which is directly above said lamp and a bottom opening which is directly below said lamp, said bottom opening forming an opening to said curing chamber to enable ultraviolet radiation to pass from said lamp to said curing chamber, said lamp causing air within said primary enclosure to become heated and said top and bottom openings enabling an upward convective airflow to develop from said bottom opening to said top opening across said lamp for cooling said lamp, (f) an outer enclosure which is located outside of said primary enclosure so as to form a flow channel between said outer enclosure and said primary enclosure, said top opening forming an airflow communication between the space within said primary enclosure and said flow channel, (g) an inlet opening at one end of said flow channel, (h) an outlet opening at the opposite end of said channel, and (i) a fan for creating a horizontal airflow through said flow channel from said inlet opening to said outlet opening and above said top opening for removing heated air which passes through said top opening from said convective airflow for maintaining the temperature of said lamp within said predetermined temperature range.

11. Curing oven as recited in claim 10, wherein said carrying case includes a bottom wall which is spaced from said housing to form a storage space for said outer closure member.

12. Curing oven for adhesive which is curable by ultraviolet radiation, said oven comprising:

(a) a housing having a curing chamber for containing an item which has an adhesive which is curable by ultraviolet radiation, said housing having an access opening to said chamber which enables said item to be inserted into and removed from said chamber, (b) an openable closure member for said access opening, (c) an ultraviolet lamp which is located above said curing chamber, said lamp being effective when energized to become heated and for generating ultraviolet radiation within a predetermined temperature range of said lamp, (d) a primary enclosure for said lamp, said enclosure having a top opening which is above said lamp and a bottom opening which is below said lamp, said bottom opening forming an opening to said curing chamber to enable ultraviolet radiation to pass from said lamp to said curing chamber, said lamp causing air within said enclosure to become heated and said top and bottom openings enabling an upward convective airflow to develop from said bottom opening to said top opening across said lamp for cooling said lamp, (e) an outer enclosure which is located outside of said primary enclosure so as to form a flow channel between said outer enclosure and said primary enclosure, said top opening forming an airflow communication between the space within said primary enclosure and said flow channel, (f) an inlet opening at one end of said flow channel, (g) an outlet opening at the opposite end of said channel, (h) a fan for creating a horizontal airflow through said flow channel from said inlet opening to said outlet opening and above said top opening for removing heated air which passes through said top opening from said convective airflow for maintaining the temperature of said lamp within said predetermined temperature range, (i) a door for said bottom opening which is divided into two separate halves, each door half being slidably mounted on said primary enclosure for movement within a horizontal plane toward and away from the other of said door hlaves between an open position in which said door halves are separated and a closed position in which said door halves abut, each of said door halves having an inner edge, the inner edge of one of said door halves being vertically offset from the inner edge of the other of said door halves so that the inner edges of said door halves overlap when they are in said closed position, (j) an electromechanical drive means operatively connected to said door, said electromechanical drive means being effective when energized to slide said door halves away from each other to said open position to expose said bottom opening, and (k) control circuitry including normally open start switch and a cycle timer which is effective to energize said electromechanical drive means when said start switch is closed for opening said door for a predetermined time period.

13. Curing oven as recited in claim 12, wherein said cycle timer is adjustable for selectively changing said predetermined time period.

14. Curing oven as recited in claim 12, wherein said electromechanical drive means includes a solenoid which is effective when energized to close said door, said control circuitry being effective to energize said solenoid during said predetermined time period.

15. Curing oven as recited in claim 14, wherein said control circuitry includes a normally open limit switch which is positioned adjacent said access opening so as to be closed by said closure member when said closure member is closed, said limit switch being effective when open to de-energize said solenoid.

16. Curing oven as recited in claim 15, wherein said control circuitry includes a sensory indicator means which is energized when said solenoid is energized to provide a sensory indication of a curing cycle.

17. Curing oven as recited in claim 16, wherein said sensory indicator is a lamp which is closely associated with said start switch.

18. Curing oven as recited in claim 12, wherein said control circuitry includes a main power switch for operatively connecting said curing oven to a source of electrical power and a sensory indicator which is energized upon closing of said main power switch.

19. Curing oven as recited in claim 18, wherein said sensory indicator is a lamp which is located on an external surface of said housing.

20. Curing oven as recited in claim 12, wherein said control circuitry includes a normally open lamp switch which is effective when closed to energize said ultraviolet lamp.

21. Curing oven as recited in claim 20, wherein said means for creating an airflow is an electric fan and said lamp switch is also effective when closed to energize said fan.

22. Curing oven as recited in claim 21, wherein said control circuitry includes a fan timer which is energized upon closing of said lamp switch and which is effective to maintain said fan energized for a predetermined time period after opening of said lamp switch.

* * * * *